United States Patent

Wegner et al.

[15] 3,642,426
[45] Feb. 15, 1972

[54] PROCESS FOR THE CONTINUOUS DYEING OF SYNTHETIC FIBER MATERIALS WITH DIPHENOXY ANTHRAQUINONE DYESTUFFS

[72] Inventors: Peter Wegner, Cologne; Rutger Neeff, Leverkusen; Robert Kuth, Cologne, all of Germany

[73] Assignee: Farbenfabriken Bayer Aktiengesellschaft, Leverkusen, Germany

[22] Filed: Aug. 3, 1970

[21] Appl. No.: 60,738

[30] Foreign Application Priority Data

Aug. 7, 1969 Germany.....................P 19 40 184.4

[52] U.S. Cl....................................................8/39, 260/380
[51] Int. Cl. ...........................................................D06p 1/20
[58] Field of Search........................................8/39; 260/380

[56] References Cited

UNITED STATES PATENTS 1,943,876  1/1934  Nawiasky et al.....................260/380
3,226,177  12/1965  Hosoda et al...............................8/39
3,510,243  5/1970  Seuret et al..................................8/39

*Primary Examiner*—George F. Lesmes
*Assistant Examiner*—T. J. Herbert, Jr.

*Attorney*—Plumley & Tyner

[57] ABSTRACT

The process for the continuous dyeing of synthetic fiber materials in which the fiber materials are impregnated with a dyeing liquor comprising an organic solvent and an anthraquinone dyestuff of formula

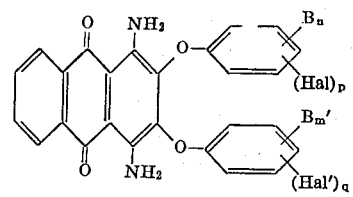

in which B and B' independently of one another represent a $C_1$–$C_9$-alkyl, cycloalkyl or aralkyl radical, Hal and Hal' denote a halogen atom, each of $m$ and $n$ is a number from 0–3, with the proviso that the sum of $m+n$ is at least 1, and each of $p$ and $q$ is a number from 0–2; and the dyed materials are subsequently subjected to a heat treatment.

The dyeings obtained are distinguished by high dyestuff yield, very good build-up and excellent fastness properties, especially very good fastness to thermofixing, washing, rubbing and light.

7 Claims, No Drawings

PROCESS FOR THE CONTINUOUS DYEING OF SYNTHETIC FIBER MATERIALS WITH DIPHENOXY ANTHRAQUINONE DYESTUFFS

The invention relates to a process for the continuous dyeing of synthetic fiber materials from organic solvents; the process is characterized in that the fiber materials are impregnated with dyeing liquors which contain anthraquinone dyestuffs of formula

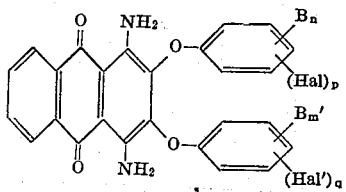

in which

B and B' independently of one another represent a $C_1$—$C_9$—alkyl, cycloalkyl or aralkyl radical, preferably a $C_1$—$C_5$—alkyl radical, Hal and Hal' denote a halogen atom, $m$ and $n$ are a number from 0–3, preferably a number from 1–2, with the proviso that the sum of $n+m$ is at least 1, and $p$ and $q$ denote a number from 0–2, preferably 0–1, and that the materials are subsequently subjected to a heat treatment.

Possible halogen substituents Hal and Hal' of the phenoxy radicals are especially chlorine and bromine atoms.

As examples of B and B' there may be mentioned: as $C_1$—$C_9$—alkyl radicals, the methyl, ethyl, propyl, iso-propyl, iso-butyl, sec.-butyl, tert.-butyl, iso-amyl, sec.-pentyl, neopentyl, methyl-pentyl, dimethyl-butyl, methyl-hexyl, dimethyl-pentyl, trimethyl-butyl, iso-octyl, methyl-heptyl, dimethyl-hexyl, trimethyl-pentyl, tetramethyl-butyl, iso-nonyl, dimethyl-heptyl and trimethyl-hexyl radical; as cycloalkyl radicals, the cyclohexyl and the methylcyclohexyl radical and as aralkyl radicals, especially the benzyl and the $\alpha$, $\alpha$-dimethylbenzyl radical.

The dyestuffs used according to the invention for dyeing from organic solvents are obtained according to processes which are in themselves known, for example by reaction of 1,4-diamino-2,3-dihalogen-anthraquinones with hydroxyaryl compounds which carry one or more alkyl or aralkyl or cycloalkyl radicals containing one to nine carbon atoms, in the presence of inorganic or organic bases.

Possible organic water-immiscible solvents for the process according to the invention are those of which the boiling points lie between 40° and 170° C., for example aromatic hydrocarbons, such as toluene or xylene and halogenated hydrocarbons, especially aliphatic chlorohydrocarbons, such as methylene chloride, chloroform, carbon tetrachloride, 1,1-dichlorethane, 1,2-dichlorethane, 1,1,2-trichlorethane, 1,1,1,2-tetrachlorethane, 1,1,2,2-tetrachlorethane, pentachlorethane, 1-chloropropane 2-chlorpropane, 1,2-dichloropropane, 1,1,1-trichloropropane, 1-chlorbutane, 2-chlorobutane, 1,4-dichlorobutane, 1-chloro-2-methylpropane or 2-chloro-2-methylpropane as well as aliphatic fluoro- and fluorochloro-hydrocarbons, such as perfluoro-n-hexane, 1,2,2-trifluorotrichlorethane and 1,1,1-trifluoropentachlorpropane, and aromatic chloro- and fluoro-hydrocarbons such as chlorobenzene, fluorobenzene, chlorotoluene and benzotrifluoride.

Tetrachlorethylene, trichlorethylene and 1,1,1-trichloroethane have proved particularly suitable. Mixtures of these solvents can also be used.

The synthetic fiber materials to be dyed according to the process of the invention are especially fiber materials of polyesters, for example polyethylene terephthalates or polyesters from 1,4-bis-(hydroxymethyl)-cyclohexane and terephthalic acid, of cellulose triacetate, of synthetic polyamides such as poly-ε-caprolactam, polyhexamethylenediamine adipate or poly-ω-amino-undecane-acid, or polyurethanes or of polyolefines. The fiber materials can be in the form of woven fabrics and knitted fabrics.

For dyeing, the dyestuffs to be used according to the invention are dissolved in organic solvents which are water-immiscible or added to these in the form of solutions in solvents which are infinitely miscible with these solvents, such as alcohols, dimethylformamide, dimethylacetamide, dimethylsulphoxide or sulpholane, and the synthetic fiber materials are impregnated with the resulting clear dyestuff solutions which can optionally further contain soluble nonionic auxiliary agents, for example the known surface-active oxethylation and propoxylation products of fatty alcohols, alkylphenols, fatty acid amides and fatty acids, for improving the uniformity of the dyeings. Thereafter the dyestuffs are fixed on the fiber materials by a heat treatment. The heat treatment can consist of a brief dry heat treatment at 120°–230° C., with the dry heat treatment optionally being preceded by an intermediate drying, or can consist of a treatment of the fiber materials in superheated solvent vapor at 100°–150° C. Small amounts of nonfixed dyestuff can be eluted by brief treatment with the cold organic solvent. It should be pointed out that mixtures of these dyestuff to be used according to the invention at times give better color yield than the individual dyestuffs and in certain cases show a better solubility in the organic medium.

Using the process according to the invention it is possible, when dyeing from organic solvents, to achieve dyeings on synthetic fiber materials which are distinguished by high dyestuff yield, very good buildup and excellent fastness properties, especially very good fastness to thermofixing, washing, rubbing and light. A further advantage of the dyestuffs to be used according to the invention is their high solubility in organic solvents, especially in tetrachlorethylene, trichlorethylene, 1,1,1-trichlorethane and 1,1,-trichloropropane, which makes it possible to carry out the dyeing even without the use of solubilizing agents.

The parts indicated in the examples which follow are parts by weight.

EXAMPLE 1

A woven fabric of polyethylene terephthalate fibers is impregnated at room temperature with a clear red-violet solution which contains 10 parts of 1,4-diamino-2,3-bis-(4-tert.-butyl-phenoxy)-anthraquinone in 990 parts of tetrachlorethylene. After squeezing out to a weight increase of 60 percent, the woven fabric is dried for 1 minute at 80° C. Thereafter the dyestuff is fixed by heating the woven fabric to 190°–220° C. for 45 seconds. Thereafter the small amount of nonfixed dyestuff is eluted by brief treatment in cold tetrachlorethylene for 20 seconds. After drying, a brilliant red-violet dyeing is obtained which is distinguished by its high dyestuff yield, very good build-up and excellent fastness properties, especially very good fastness to thermofixing, washing, rubbing and light.

Equivalent red-violet dyeings were also obtained analogously on woven fabrics of (a) cellulose triacetate, (b) synthetic polyamides or polyurethanes and (c) polypropylene fibers; the only difference was that the thermosol treatment was carried out at 200°14 220° C. for (a), at 170°–200° for (b) and at 120°–150° C. for (c).

Equivalent dyeings were also obtained if the 990 parts of tetrachlorethylene were replaced by the same amount of one of the following solvents: methylene chloride, chloroform, carbon tetrachloride dichlorethane, trichlorethane, trichlorethylene, tetrachlorethane, dichloropropane, 1,1,1-trichloropropane, chlorobutane, dichlorobutane, 1,2,2-trifluorotrichlorethane and 1,1,1trifluor-pentachloropropane.

The dyestuff used had been manufactured as follows:

Three hundred and fifty parts of 4-tert.-butylphenol and 38.4 parts of powdered potassium hydroxide were heated to 150° C., with the water of reaction being distilled off. 48.4 parts of 1,4-diamino-2,3-dichloro-anthraquinone were then introduced while passing in nitrogen. The reaction mixture was heated to 190°–195° C. until no further starting material was chromatographically detectable. After diluting the reaction mixture with methanol at 70° C., the dyestuff which had crystallized out in long needles was filtered off and washed with hot water until neutral. Yield: 81.4 parts.

The dyestuffs used in the Examples 2 which follow were manufactured analogously, except that instead of the 350 parts of 4-tert.-butylphenol the equivalent amount of the phenols on which the phenoxy substituents are based was employed.

EXAMPLE 2

A knitted fabric of polyhexamethylenediamine adipate filaments is impregnated at room temperature with a clear red-violet solution which contains 10 parts of 1,4-diamino-2,3-bis-(4-methylphenoxy)-anthraquinone and 7 parts of nonylphenol-heptaglycol-ether in 983 parts of tetrachlorethylene. After squeezing out to a weight increase of 60 percent, the knitted fabric is dried for 1 minute at 80° C. Thereafter the dyestuff is fixed by heating the knitted fabric to 192° C. for 45 seconds. Small amounts of nonfixed dyestuff are then eluted by brief treatment in cold tetrachlorethylene for about 20 seconds. After drying, a brilliant red-violet dyeing is obtained which is distinguished by its high dyestuff yield, very good buildup and excellent fastness properties, especially very good fastness thermofixing, washing, rubbing and light.

An equivalent dyeing was also obtained if instead of the 983 parts of tetrachlorethylene the same amount of toluene, xylene, chlorobenzene, dichlorobenzene, fluorobenzene or benzotrifluoride was used.

EXAMPLE 3

A woven fabric of polypropylene fibers is impregnated at room temperature with a clear red-violet solution which contains 10 parts of 1,4-diamino-2,3-bis-(3,5-diisopropyl-phenoxy)-anthroquinone and 7 parts of nonylphenol-heptaglycol-ether in 983 parts of tetrachlorethylene. After squeezing out to a weight increase of 60 percent, the woven fabric is dried for 1 minute at 80° C. Thereafter the dyestuff is fixed by heating the woven fabric to 140° C. for 30 seconds. Nonfixed amounts of dyestuff can be eluted by brief treatment in cold solvent. A red-violet dyeing is obtained which is distinguished by high dyestuff yield, very good buildup and excellent fastness properties, especially very good fastness to thermofixing, washing, rubbing and light.

EXAMPLE 4

A woven fabric of poly-1,4-cyclohexanedimethylene terephthalate is impregnated at room temperature with a clear red-violet solution which contains 10 parts of 1,4-diamino-2,3-bis-(4-isooctyl-phenoxy)-anthraquinone and 7 parts of nonylphenol-heptaglycol-ether in 983 parts of tetrachlorethylene. After squeezing out to a weight increase of 60 percent, the woven fabric is dried for 1 minute at 80° C. Thereafter the dyestuff is fixed by heating the woven fabric to 190°–220° C. for 45 seconds. The small amount of nonfixed dyestuff is then eluted by brief treatment in cold tetrachlorethylene for 20 seconds. After drying, a clear red-violet dyeing is obtained which is distinguished by its high dyestuff yield, very good buildup and excellent fastness properties, especially very good fastness to thermofixing, washing, rubbing and light.

EXAMPLE 5

A woven fabric of polyethylene terephthalate fibers is impregnated at room temperature with clear red-violet solution which contains 10 parts of 1,4-diamino-2,3-bis-(2-methyl-phenoxy)-anthraquinone in 990 parts of 1,1,1-trichlorethane. After squeezing out to a weight increase of 60 percent, the dyestuff is fixed by treating the woven fabric with superheated 1,1,1-trichlorethane vapor at 140° C. for 45 seconds. Thereafter the small amount of nonfixed dyestuff is eluted by brief rinsing in cold 1,1,1-trichlorethane. After drying, red-violet dyeing is obtained which is distinguished by its high dyestuff yield, very good build-up and excellent fastness properties.

EXAMPLE 6

A woven fabric of poly-1,4-cyclohexanedimethylene terephthalate is impregnated at room temperature with a clear red-violet solution which contains 10 parts of 1,4-diamino-2,3-bis-(3,4-dimethyl-phenoxy)-anthraquinone in 990 parts of tetrachlorethylene. After squeezing out to a weight increase of 60 percent, the dyestuff is fixed by treating the woven fabric with superheated tetrachlorethylene vapor at 150° C. for 35 seconds. The small amount of nonfixed dyestuff is then eluted by brief rinsing in cold tetrachlorethylene. After drying, a red-violet dyeing is obtained which is distinguished by its high dyestuff yield, very good build-up and excellent fastness properties.

Clear red-violet dyeings of excellent fastness properties on woven fabrics of polyester, triacetate, polyamide, polyurethane and polyolefine fibers were also obtained if instead of the dyestuff indicated, the same amount of a dyestuff indicated in the table which follows was used:

| Example | Dyestuff |
|---|---|
| 7 | 1,4-diamino-2,3-bis-(3-methyl-phenoxy)-anthraquinone |
| 8 | 1,4-diamino-2,3-bis-(2-ethyl-phenoxy)-anthraquinone |
| 9 | 1,4-diamino-2,3-bis(2,4-dimethyl-phenoxy)-anthraquinone |
| 10 | 1,4-diamino-2,3-bis-(2,6-dimethyl-phenoxy)-anthraquinone |
| 11 | 1,4-diamino-2,3-bis-(3,5-dimethyl-phenoxy)-anthraquinone |
| 12 | 1,4-diamino-2,3-bis-(4-chloro-3,5-dimethyl-phenoxy)-anthraquinone |
| 13 | 1,4-diamino-2,3-bis-(2,5-dimethyl-phenoxy)-anthraquinone |
| 14 | 1,4-diamino-2,3-bis-(2-isopropyl-phenoxy)-anthraquinone |
| 15 | 1,4-diamino-2,3-bis-(3-ethyl-5-methyl-phenoxy)-anthraquinone |
| 16 | 1,4-diamino-2,3-bis-(2-isobutyl-phenoxy)-anthraquinone |
| 17 | 1,4-diamino-2,3-bis-(4-isopropyl-phenoxy)-anthraquinone |
| 18 | 1,4-diamino-2,3-bis-(2-isopropyl-3-methyl-phenoxy)-anthraquinone |
| 19 | 1,4-diamino-2,3-bis-(2-isopropyl-4-methyl-phenoxy)-anthraquinone |
| 20 | 1,4-diamino-2,3-bis-(4-isoamyl-phenoxy)-anthraquinone |
| 21 | 1,4-diamino-2,3-bis-(4-isohexyl-phenoxy)-anthraquinone |
| 22 | 1,4-diamino-2,3-bis-(4-cyclohexyl-phenoxy)-anthraquinone |
| 23 | 1,4-diamino-2,3-bis-[4-(2-phenyl-propyl-(2))-phenoxy]-anthraquinone |
| 24 | 1,4-diamino-2,3-bis-(4-benzyl-phenoxy)-anthraquinone |
| 25 | 1,4-diamino-2,3-bis-(4-isononyl-phenoxy)-anthraquinone |

Example 26 woven fabric of cellulose triacetate fibers is impregnated at room temperature with a clear red-violet solution which contains 5 parts of the dyestuff described in Example 1, 5 parts of the dyestuff described in Example 2 and 7 parts of nonylphenol-heptaglycol-ether in 983 parts of tetrachlorethylene. After squeezing out to a weight increase of 60 percent, the woven fabric is dried for 1 minute at 80° C. Thereafter the dyestuff is fixed by heating the woven fabric to 215° C. for 1 minute. A brilliant red-violet dyeing is obtained, which is distinguished by high dyestuff yield, very good build-up and excellent fastness properties, especially very good fastness to thermofixing, washing, rubbing and light.

Example 27

A woven fabric of anionically modified polyethylene terephthalate fibers (Dacron 64) is impregnated at room temperature with a clear red-violet solution which contains 10 parts of a mixture of the isomeric 1,4-diamino-2,3-bis-cresoxy-anthraquinones and 7 parts of nonylphenol-heptaglycolether in 983 parts of tetrachlorethylene. After squeezing out to a weight increase of 60 percent, the woven fabric is dried for 1 minute at 80° C. and the dyestuff is fixed by heating the woven fabric to 190°–220° C. for 1 minute. A brilliant red-violet dyeing is obtained, which is distinguished by very good dyestuff yield, very good buildup and excellent fastness properties, especially very good fastness to thermofixing, washing, rubbing and light.

Equivalent red-violet dyeings were also obtained on woven fabrics of anionically modified polyhexamethylenediamine adipate fibers (Nylon T 844).

The dyestuff mixture used had been manufactured as follows:

One hundred and sixty parts of a mixture of equal parts of the isomeric cresols were heated to 150° C. with 19 parts of potassium hydroxide, with the water of reaction being distilled off. 24.2 parts of 1,4-diamino-2,3dichlor-anthraquinone were then introduced under nitrogen. The reaction mixture was heated to 190°–195° C. for 20 hours and subsequently stirred into dilute sodium hydroxide solution. The dyestuff mixture which precipitated as an oil was separated off in a separating funnel and twice extracted by shaking with methanol. After drying in vacuo, 18 parts of dyestuff mixture were obtained.

We claim:

1. Process for the continuous dyeing of synthetic fiber materials from organic solvents, which comprises impregnating said fiber materials with organic solvent dyeing liquors which contain anthraquinone dyestuffs of formula

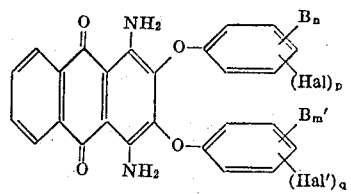

in which
B and B' independently of one another represent a $C_1$–$C_9$—alkyl, cycloalkyl or aralkyl radical,
Hal and Hal' denote a halogen atom,
$m$ and $n$ are a number from 0–3, with the proviso that the sum of $n+m$ is at least 1, and
$p$ and $q$ denote a number from 0–2,
and that the materials are subsequently subjected to a heat treatment.

2. Process according to claim 1 wherein $m$ and $n$ have the significance indicated in claim 1 and B and B' independently of one another denote a $C_1$–$C_5$—alkyl group, and $p$ and $q$ is a number from 0–1.

3. Process according to claim 1 wherein said anthraquione dyestuff is 1,4-diamino-2,3-bis-cresoxy-anthraquinone.

4. Process according to claim 1 wherein said anthraquione dyestuff is 1,4-diamino-2,3-bis-(ethyl-phenoxy)-anthraquinone.

5. Process according to claim 1 wherein said anthraquione dyestuff is 1,4-diamino-2,3-bis-(dimethyl-phenoxy)-anthraquinone.

6. Process according to claim 1 wherein said anthraquione dyestuff is 1,4-diamino-2,3bis-(isopropyl-phenoxy)-anthraquinone.

7. Synthetic fiber materials dyed according to claim 1.

* * * * *